United States Patent [19]

Popov et al.

[11] 4,231,532
[45] Nov. 4, 1980

[54] TAPE CASSETTE WITH IMPROVED TAPE GUIDING

[75] Inventors: George D. Popov, Milpitas; Howard W. Robinson, San Jose, both of Calif.

[73] Assignee: Verbatim Corporation, Sunnyvale, Calif.

[21] Appl. No.: 61,653

[22] Filed: Jul. 30, 1979

[51] Int. Cl.³ .......................... G03B 1/04; G11B 15/32
[52] U.S. Cl. ................................................. 242/199
[58] Field of Search ................ 242/199, 200, 76, 197, 242/198, 55.19 A

[56] References Cited

U.S. PATENT DOCUMENTS

| 3,549,104 | 12/1970 | Morrow | 242/76 |
| 3,934,842 | 1/1976 | Posso | 242/199 |
| 3,980,256 | 9/1976 | Schwartz et al. | 242/199 |
| 3,991,956 | 11/1976 | Machida | 242/76 |
| 4,166,593 | 9/1979 | Milants | 242/199 |

*Primary Examiner*—Leonard D. Christian
*Attorney, Agent, or Firm*—Thomas E. Schatzel

[57] ABSTRACT

A precision data cassette utilizing stationary semicylindrical guide elements fixedly mounted to the cassette housing shell in the media path between the corner roller and the magnetic recording head.

8 Claims, 3 Drawing Figures

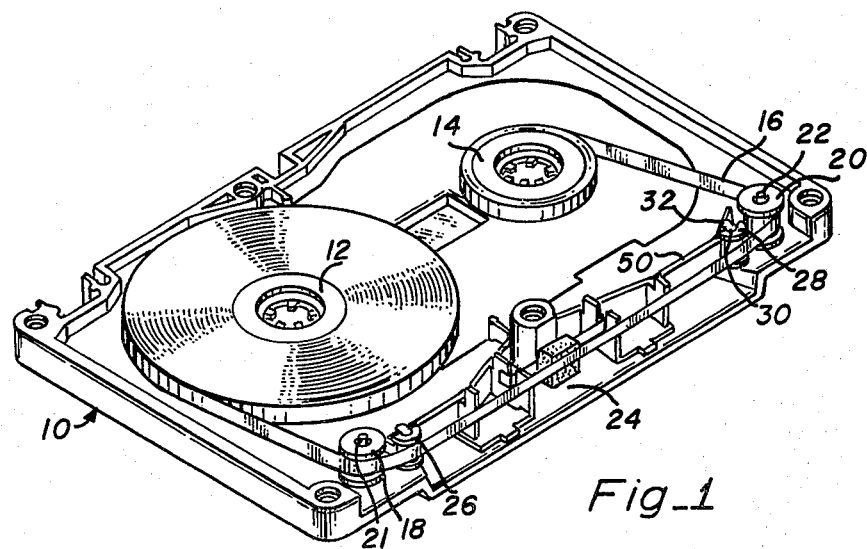
Fig_1
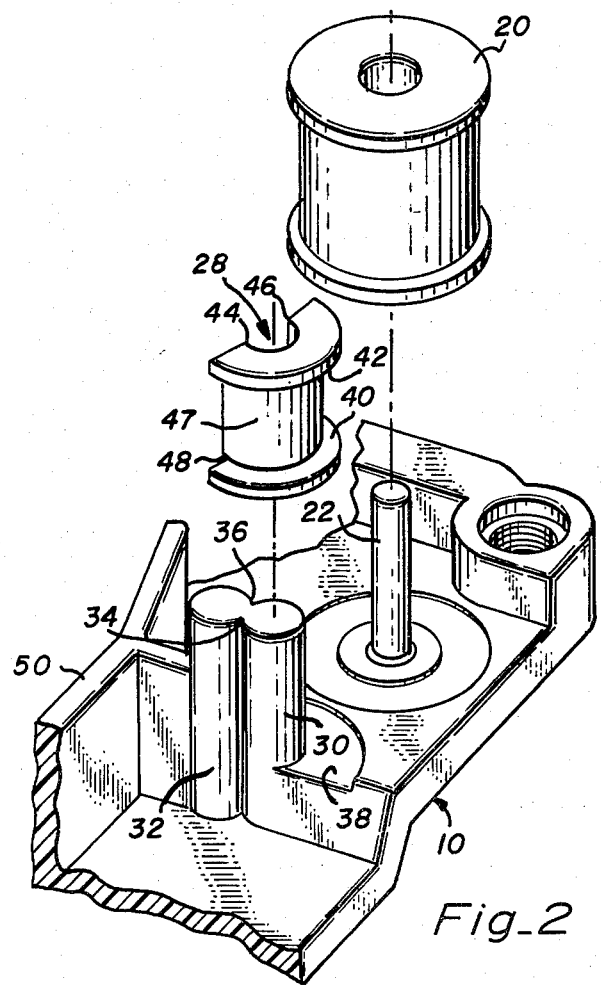
Fig_2
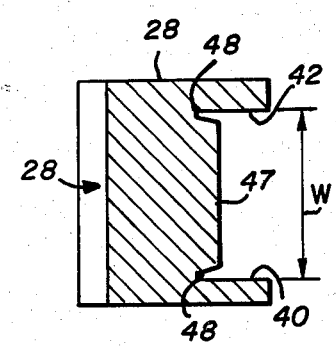
Fig_3

TAPE CASSETTE WITH IMPROVED TAPE GUIDING

BACKGROUND OF THE INVENTION

1. Field of the Invention

The field of the invention relates to a means for accurately guiding flexible magnetic recording tape within a data cartridge. The invention is particularly applicable to precision magnetic recording cassettes where said cassettes are intended for head alignment purposes and/or other critical recording applications.

2. Description of the Prior Art

Many techniques have been employed over the years to accurately position magnetic recording tape with respect to a magnetic recording read/write transducer or head. Stationary posts, rollers of various geometries with and without flanges, and blasts of air have all been used to guide magnetic recording tape. The object of all of the techniques has been to position the magnetic medium in space so that the reading and writing of information may be performed reliably, i.e. without error. Reliable retrieval of information from magnetic media is very difficult, if not impossible, if the magnetic recording gap of the head is not precisely located with respect to information which is desired to be read. By far the most common and least expensive way of guiding magnetic recording tape has been by a combination of stationary guides used in conjunction with rollers carefully positioned within the tape path to achieve the desired tracking accuracy.

U.S. Pat. No. 3,263,936 to Williams discloses a tape cassette utilizing two hubs or flanged spools located coaxially within a housing wherein posts or guides fixedly mounted to a transparent cover guide the tape from one spool hub to the other. Because of the configuration of the tape cassette, a change in the plane of motion of the tape is required, and said posts or guides achieve said change in plane. The posts or stationary guides are formed and/or shaped to properly track the tape from the plane of one hub or spool to the other, but the invention does not teach or even suggest how extreme tracking accuracy in the area of the magnetic head can be achieved.

U.S. Pat. No. 3,744,696 to Warren teaches the use of a guide apparatus for controlling the contact of a magnetic recording medium or web with the periphery of a pinch roller. In order to reduce the contact wrap of the magnetic medium with the pinch roller, a guide mechanism lifts the magnetic medium off the pinch roller. While Warren recognizes the need for accurate control of the position of the magnetic medium, the application of guides to magnetic tape in a cassette environment or the application of guides to critically control the positioning of the tape in the area of the magnetic recording head is not taught or even suggested.

U.S. Pat. No. 3,831,882 to Fitterer et al discloses the use of stationary guides to magnetic recording cassettes to control the path of the tape coming from a flangeless spool and crossing a roller prior to contact with a magnetic recording head. By its structure, considerable vertical tolerance variation on the position of the flangeless spools within the tape cassette occurs. Uncontrolled variation of the height of said spools within the cassette causes degradation in the reliability of the magnetic recording cassette. Compensation for said spool height variation is attempted by guiding the tape in its path from the flangeless spool to the edge roller of the cassette. The problem of edge roller vertical motion is not addressed, and while the invention does somewhat improve the tracking accuracy and repeatability of the position of the tape in space within the cassette, the guiding of the magnetic recording tape within the area of the magnetic recording head after the edge roller is not taught or suggested.

U.S. Pat. No. 3,991,956 to Machida suggests use of stationary guides to control the position of the magnetic recording tape within a tape cassette. However, like Fitterer et al as discussed above, Machida teaches the guiding of the tape between the reel and the edge roller. Such guiding is necessitated by allowable tolerances within the cassette permitting the vertical position of the reels within the cassette to significantly vary. As the most critical position of the tape within the cassette is its relationship to the magnetic recording head during reading and/or writing, neither Fitterer et al nor Machida teach guiding of the magnetic recording medium in an area other than between the take-up or supply reels and the edge rollers. Neither teach or even suggest addressing the guiding problem in the area where it is most critical, i.e. between the edge rollers in the area of the magnetic recording head.

SUMMARY OF THE PRESENT INVENTION

The invention teaches the use of semi-cylindrical shaped stationary guide elements positioned adjacent to the tape cassette edge rollers wherein one stationary guide element is on each side of the magnetic recording head rigidly affixed to the cassette housing. The dimensions of the stationary guide elements are established such that the magnetic recording tape will fit precisely between the guide elements allowing a vertical motion of the tape by no more than 0.003 inches. Typical cassettes of the prior art allow vertical excursions of the tape due to tolerance build up and motion of the edge rollers by as much as 0.012 to 0.015 inches. Such edge roller motion causes tracking errors seriously degrading the magnetic recording performance of the cassette. Thus, approximately, a 5 to 1 improvement in the vertical tracking accuracy of the tape may be realized by the use of stationary guides properly situated between the edge rollers of a magnetic recording cassette on either side of the read/write head.

It is thus an object of the present invention to provide a structure wherein the vertical tracking error typically experienced in magnetic recording cassettes is significantly reduced.

It is a further object of the present invention to improve the tracking accuracy of the tape in magnetic recording cassettes by an improvement which is both inexpensive and easy to implement in manufacturing.

It is another object of the present invention to provide a means to improve the vertical tracking accuracy in magnetic recording cassettes wherein said improvements in the cassette design may be incorporated in certain cassettes intended for high precision applications and deleted in other lower precision cassettes by use of the same basic cassette shell housing design.

It is yet another object of the invention to preserve the dust shielding capabilities of the magnetic recording cassette when either utilizing the high precision tracking improvement or not depending upon the user requirements.

It is another object of the invention to provide a means for improving the tracking accuracy of magnetic recording tape as used in a magnetic recording cassette wherein said means for improving the tracking accuracy will not appreciably wear out after repeated passes of the magnetic recording medium.

These and other objects will no doubt become apparent after a reading of the following detailed description of a preferred embodiment which is illustrated in the drawings.

IN THE DRAWINGS

FIG. 1 is a perspective view of a tape cassette of the present invention including the improved stationary guide elements;

FIG. 2 is an exploded detailed view of a corner of the improved tape cassette of FIG. 1 showing a corner roller and the improved stationary guide; and FIG. 3 is a cut-away view of one of the stationary guide elements of FIG. 1.

DETAILED DESCRIPTION OF THE PREFERRED EMBODIMENT

Referring to FIG. 1, a cassette shell, referred to by the general reference character 10, forms the housing for the basic cassette mechanism. A mating cassette shell (not shown) is adapted to fit with cassette shell 10 so as to enclose the cassette internal components within a dust free enclosure. Within cassette shell 10 are a pair of reels 12 and 14 with a magnetic tape 16 wound therebetween so that the tape path makes a loop between a corner roller 18 and a corner roller 20. Corner roller 18 rotates about a pin 21 and corner roller 20 rotates about a pin 22. The length of pins 21 and 22 is such that corner rollers 18 and 20, respectively, will have some allowable end play when the cassette is assembled by mating the two halves of the housing shell.

Interposed in the tape path between the corner rollers 18 and 20 is a space 24 adapted for receiving the magnetic recording head for recording or reproducing data to or from the tape 16. A pair of stationary guide elements 26 and 28 are on opposite sides of the space 24. Stationary guide element 28, as shown in FIG. 2, is adapted to slide over a boss 30 which may be cast into the cassette shell 10 or fastened to the cassette shell by other conventional means such as a press fit or adhesive. In the preferred embodiment, boss 30 is formed in the shape of a cylinder protruding vertically from cassette shell 10. Boss 30 is adjacent and connected to a boss 32 which also protrudes vertically from the cassette shell 10. No space or air gap is permitted between boss 30 and boss 32. Boss 30 and boss 32 therefore meet each other along parting lines 34 and 36, as shown in FIG. 2. When guide element 28 is fully seated upon boss 30 it comes to rest upon a depression 38 formed within the cassette shell 10. Depression 38 is designed so that when the stationary guide element 28 is fully seated against depression 38, surfaces 40 and 42 of stationary guide element 28 will be accurately positioned with respect to the cassette locating surfaces (not shown). To achieve the ultimate desired precision of the magnetic tape cassette, surfaces 40 and 42 of stationary guide element 28 must be positioned extremely accurately with respect to the bottom and top locating reference surfaces, respectively, of the cassette shell.

In the preferred embodiment, it has been found suitable to cement stationary guide element 28 to boss 30 to prevent relative motion therebetween when the cassette is fully assembled. The partial circular guide element 28 has terminal edges 44 and 46. When the stationary guide element 28 is in place over boss 30, the edges 44 and 46 prevent rotation of the guide element through interference with parting lines 34 and 36, respectively, formed between boss 30 and boss 32. In addition because stationary guide element 28 surrounds the periphery of boss 30 by greater than 180°, boss 30 acts to capture and hold stationary guide element 28. Although not described herein, a similar construction exists for stationary guide element 26 mounted in the tape path adjacent to edge roller 18.

Stationary guide element 28 is shown in a cut-away view of FIG. 3. The magnetic recording tape 16 is adapted to slide over a surface 47 during operation of the cassette. The distance "w" between surfaces 40 and 42 in FIG. 3 is precision machined so that surfaces 40 and 42 will guide the edges of the tape during operation of the cassette. By industry standard, the width of the magnetic recording tape is dimensioned to be between 0.148 inches and 0.150 inches. In the preferred embodiment, it has been found suitable to hold dimension "w" between 0.150 and 0.151 inches. The maximum vertical tracking error of the magnetic recording tape therefore has been reduced to a maximum of 0.003 inches and to 0.000 in the best case. It should be noted that undercut 48 as shown in FIG. 3 of stationary guide element 28 prevents tracking error caused by a radius in the corner between surface 47 and surfaces 40 and 42, respectively.

Several other points should be understood to fully realize the benefits of the invention. First, when the cassette is fully assembled, stationary guide elements 26 and 28 are adapted so that the magnetic tape 16 will wrap around stationary guide elements 26 and 28 by some finite amount. Theoretical line contact between magnetic tape 16 and guide surface 47 is not practicably acceptable, because it is difficult for edges 40 and 42 to guide magnetic tape 16 in such an instance. A tape wrap angle of several degrees, however, has been found to be acceptable. Second, stationary guide elements 26 and 28 have been designed so that if it is desired to manufacture a magnetic recording cassette of lower precision, stationary guide elements 26 and 28 may be eliminated from the manufacturing process without causing any assembly or functional problems whatsoever. The tape will not contact boss 30 of FIG. 2 (nor a similarly situated boss holding stationary guide element 26), but rather the tape will simply pass without interference or contact with the mounting bosses used for stationary guide elements 26 and 28. In this manner, a cassette of extreme precision may be manufactured by incorporating stationary guide elements 26 and 28, or a cassette of lower precision may be manufactured by simply not including those components. Third, the configuration of the bosses for mounting stationary guide elements 26 and 28 is such that when stationary guide elements 26 and 28 are not installed within the cassette housing, dust shielding for the internal components is not impaired. That is, boss 32 as shown in FIG. 2 acts as a dust shield in combination with cassette housing rib 50 as well as a member preventing rotation of stationary guide element 28 with respect to boss 30. It is conceivable that the guiding function alone of stationary guide element 28 (and similarly for stationary guide element 26) could be performed by simply cementing stationary guide element 28 to boss 30 and the cement would prevent rotation therebetween. However, if boss 32 were not present, an air gap allowing particulate contamination to enter the cassette mechanism would exist between the stationary guide element 28 and cassette housing rib 50, and therefore, boss 32 provides dust shielding as well as a convenient assembly technique to rotationally locate stationary guide element 28 upon boss 30 when seated against depression 38. Fourth, stationary guide elements 26 and 28 may simply be slid upon their respective mounting bosses and such has been found to be acceptable for achieving precision tape tracking accuracy. However, in the preferred embodiment, stationary guide elements 26 and 28 are fixedly mounted in place either by cementing stationary guide elements 26 and 28 to their respective bosses or press-fitting said stationary guide elements to their mounting bosses by appropriately adapting the dimensions of the components to be press fit. Fifth, the surface finishes of surfaces 47, 40 and 42 of FIG. 3 have been found in the preferred embodiment to be satisfactory if machined to an RMS surface finish of 16 micro-inches. Sixth, the ultimate requirements of the invention are best met when the material of stationary guide elements 26 and 28 is relatively hard and nonwearing. In the preferred embodiment, the stationary guide elements have been machined from nonmagnetic stainless steel, but ceramic materials have also been used with success. If accuracy of the cassette is not required after many passes of the tape, i.e. initial accuracy is all that is needed, or if manufacturing cost reduction is desired, stationary guide elements 26 and 28 may be formed integrally as part of cassette housing 10. In a similar manner, bosses 30 and 32 may be formed as a unitary structure with the cassette housing or be separate structures depending upon individual design goals and cost objectives.

While for the sake of clarity, and in order to disclose the invention so that the same can be readily understood, specific embodiments have been described and illustrated, it is to be understood that the present invention is not limited to the specific means disclosed. It may be embodied in other ways that will suggest themselves to persons skilled in the art. It is believed that this invention is new and that all such changes that come within the scope of the following claims are to be considered as part of this invention.

We claim:
1. A precision tape cassette with improved vertical tape tracking accuracy comprising:
   a cassette shell having a base and forming a first frontal corner, a second frontal corner and a space along a frontal path intermediate said first and second frontal corners, said space being provided to receive a magnetic recording/reproducing head to interface with a magnetic tape transported along said frontal path;
   a first corner guiding element positioned adjacent said first frontal corner and protruding vertically from said base of the shell;
   a second corner guiding element positioned adjacent said second frontal corner and protruding vertically from said base of the shell;
   a first pair of integral arcuate segments forming a first 8-shaped boss protruding vertically from the shell along an axis parallel to the axis of said first corner guiding element, the first boss being integral with the shell and interposed intermediate the first corner guiding element and said space;
   a first arcuate stationary guide member having a central arcuate channel of greater than 180° and less than 360°, the first guide member being interlocked with the first boss and coaxial therewith, the first arcuate guide member having flanges at opposite ends to form a substantially U-shaped groove, the first stationary guide member being positioned to interface with the transported tape in said groove;
   a first arcuate depression within said base and coaxial with the first arcuate guide member with one flange of the first guide member being seated within said first depression;
   a second pair of integral arcuate segments forming a second 8-shaped boss protruding vertically from the shell along an axis parallel to the axis of the second corner guiding element, the second boss being integral with the shell and interposed intermediate the second corner guiding element and said space;
   a second arcuate stationary guide member having a central arcuate channel of greater than 180° and less than 360°, the second guide member being interlocked with the second boss and coaxial therewith, the second arcuate guide member having flanges at opposite ends to form a substantially U-shaped groove, the second stationary guide member being positioned to interface with the transported tape in said groove; and
   a second arcuate depression within said base and coaxial with the second arcuate guide member with one flange of the second guide member being seated within said second depression.

2. The precision tape cassette of claim 1 wherein, each of the first and second arcuate stationary guide members are cylindrically shaped having an outer arcuate periphery of greater than 180° and less than 360° with a chord interconnecting the ends of the arc, and an inner arcuate channel of greater than 180° and less than 360° with the radius of the inner channel being substantially equal to the radius of arcuate segments of the first and second bosses.

3. The precision tape cassette of claims 1 or 2 wherein,
   each of the first and second arcuate stationary guide members includes undercuts about the intersection of said flanges.

4. The precision tape cassette of claims 1 or 2 wherein,
   rib means project vertically from and integral with said base and extend at least end-to-end to the first and second bosses, whereby forming a dust shield.

5. The precision tape cassette of claims 1 or 2 wherein,
   the depth of said first and second arcuate depressions are substantially equal to each other and to the thickness of said flanges.

6. The precision tape cassette of claims 1 or 2 wherein,
   the first and second guide memembers are cemented to the first and second bosses, respectively.

7. The precision tape cassette of claims 1 or 2 wherein,
   each of the first and second arcuate stationary guide members includes undercuts about the intersection of the flanges; and
   the depth of said first and second arcuate depressions are substantially equal to each other and to the thickness of said flanges.

8. The precision tape cassette of claims 1 or 2 wherein,
   the depth of said first and second arcuate depressions are substantially equal to each other and to the thickness of said flanges; and
   rib means projects vertically from and integral with said base and extend at least end-to-end to the first and second bosses, whereby forming a dust shield.

* * * * *